F. E. PARADIS.
HOSE COUPLING.
APPLICATION FILED MAR. 17, 1913.
1,091,759.
Patented Mar. 31, 1914.
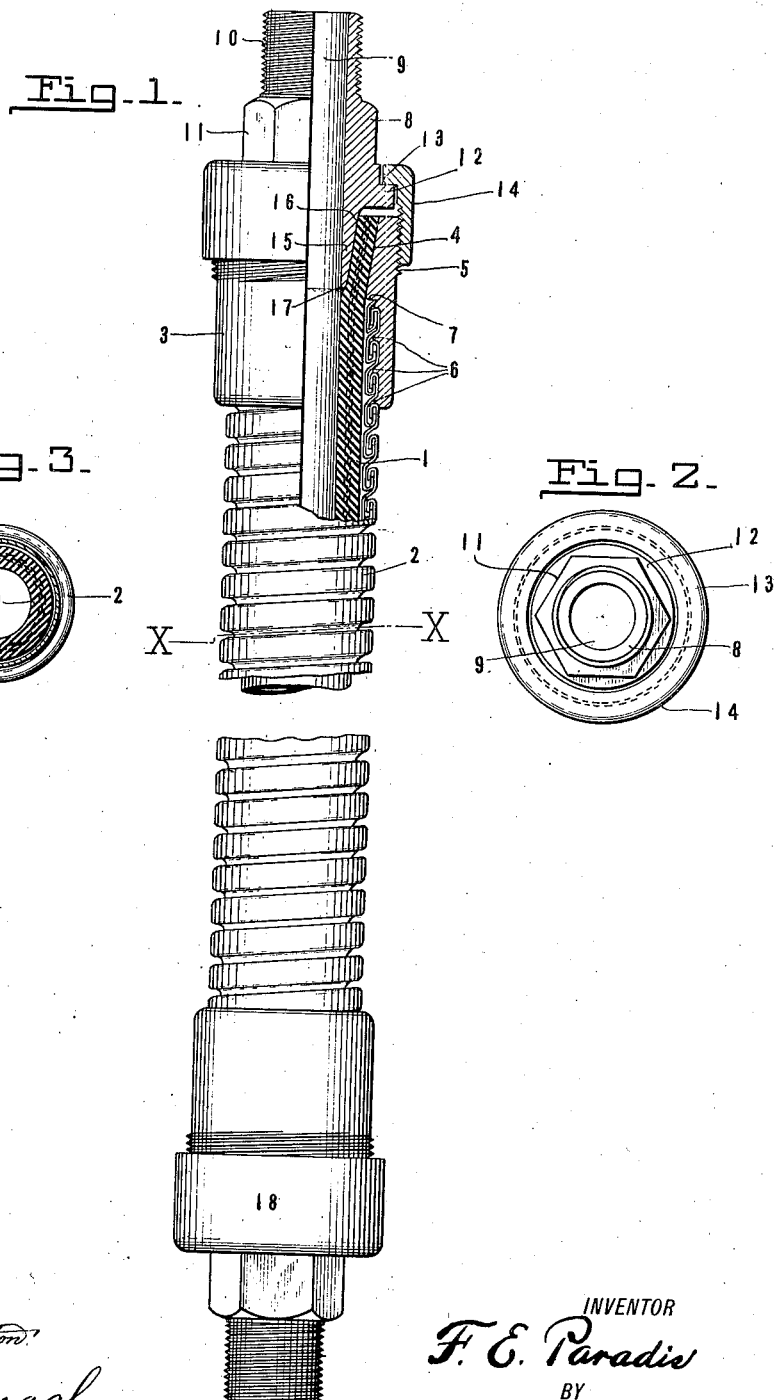
WITNESSES:
Jesse A. Holton
H. McKavanagh
INVENTOR
F. E. Paradis
BY
Dull, Warfield & Dull
ATTORNEYS.

UNITED STATES PATENT OFFICE.

FREDERIK E. PARADIS, OF BUFFALO, NEW YORK.

HOSE-COUPLING.

1,091,759.

Specification of Letters Patent. Patented Mar. 31, 1914.

Application filed March 17, 1913. Serial No. 754,673.

*To all whom it may concern:*

Be it known that I, FREDERIK E. PARADIS, a citizen of the United States, residing at Buffalo, in the county of Erie and State of New York, have invented certain new and useful Improvements in Hose-Couplings, of which the following is a full, clear, and exact description, such as will enable others skilled in the art to which it appertains to make and use the same.

This invention relates to conduits for air, steam, and other fluids, and for electrical conductors and similar wires, and with respect to its more specific features to flexible protected conduits of the character referred to embodying coupling elements, whereby a single conduit of the character referred to may be readily attached to and detached from a conduit system composed of other or like conduits.

The invention is specially applicable in the air brake systems, steam and electric heating systems, and electric lighting systems of railway rolling stock, offering many advantages in readily establishing, maintaining, and breaking the continuity of such systems, and facilitating the repair or replacement of worn parts. It probably finds its most important application in the short conduit coupling pipe employed to establish continuity between the braking, heating and lighting equipment of railway cars and for this reason the disclosure of the invention is preferably embodied in such a device, and one through which a fluid is to pass.

One of the objects of the invention is the provision of protected or armored conduits of practical construction permitting of the ready removal of the inner conduit tube from the armor.

Another object of the invention is the provision of coupling elements for armored conduits whereby a large part of the strains, due to internal pressure, is taken up by the armor.

Another object of the invention is the provision of simple and efficient means for connecting the inner conduit tube to the armor tube so as to provide a fluid-tight joint in the conduit system and without tendency to deface, destroy or perforate the inner tube.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein similar reference characters refer to similar parts throughout the several views, Figure 1 illustrates the preferred embodiment of the invention, a portion being partly broken away in order to disclose the interior arrangement; Fig. 2 illustrates an end view; and Fig. 3 a section on line $x-x$, Fig. 1.

Referring now more particularly to the drawings, the numeral 1 indicates an inner cylindrical, flexible tube or conduit composed of rubber, rubber covered with canvas, or of other suitable material capable of conducting a fluid such as water or steam and also capable of withstanding the pressures which may be engendered therein. Or said inner tube may be made of flexible material of a character to insulate an electrical conductor passing therethrough. The tube 1 is surrounded by a protective casing 2, preferably metallic, and composed of spirally disposed interlocking elements, so disposed as to form relatively large superficial threads, as illustrated, the interlocking elements have some slight longitudinal play, said casing thus having some lateral bodily flexibility permitting it to be bent in various directions. The character of the interlocked elements is preferably such as to cover the inner tube at all points, and while the form illustrated is preferred, any efficient and suitable type may be employed. Thus the inner tube provides a fluid-tight conduit and the outer tube a flexible casing relatively closely surrounding and protecting the inner tube, the two thus forming an armored hose.

In armored constructions previously employed, it has been found impracticable to associate the armor tube with the inner flexible conduit in a simple and practical manner so as to provide an efficient fluid-tight connection therebetween. Furthermore, in armored conduits as constructed heretofore, the armor has been so closely linked with the inner tube, or lining, that the two have become one for all practical purposes, the destruction of one involving the destruction of the other, and by reason of said close association of the inner and the armor tube in prior structures, any irregularities of the inner surface of the armor tube, or any special construction thereof whereby projecting portions occur on the inner surface frequently caused the rupture of the inner tube, especially adjacent the coupling elements, whether the strains be due to internal pressure in the conduit or to the external force applied in assembling the inner and outer tube with the coupling elements, or in bending the associated tubes. In order to avoid the above and other objections, the diameters of the inner tube and the armor tube of applicant's construction are such that the former may be readily inserted or withdrawn from the latter, the outer diameter of the inner tube being preferably smaller than the inner diameter of the armor tube so as to fit loosely therein under inactive conditions.

The numeral 3 indicates a coupling element, ferrule, or clamping jaw, having at its outer end an opening providing an inner continuous concentric wall or seat 4 axially inclining and decreasing in size from the outer toward the inner end thereof. The outside peripheral wall of the ferrule is preferably cylindrical and is threaded near the outer end as at 5 for a purpose which will be hereinafter described. The inner peripheral wall of the ferrule is of greater diameter than the inner end of the seat 4, and is provided with armor retaining or holding means, preferably a series of threads 6 of such dimensions as to correspond with the threads formed by the spiral indentations of the armor tube so that the latter may be readily, as it were, screwed into the ferrule and be supported and retained in position by the threads 6. The diameter of the inner threaded portion of the ferrule is preferably such that when the armor tube is threaded therein the inner surface of the armor tube will be almost flush with the inner edge of the wall 4, there being no sharp edge or projecting surface at the inner edge of the shoulder 7 against which the inner end of the armor tube abuts when screwed home.

The numeral 8 indicates a second, or companion, coupling element, or clamping jaw, and preferably comprises a nipple having a fluid passageway 9 preferably of substantially the same diameter as the inner diameter of the inner tube so as to reduce friction as much as possible, and said nipple is provided with outer screw-threads 10 for attachment to a train-pipe system, so that the conduit 1 will be connected therein, the passage 9 thus forming part of the conduit.

The numeral 11 represents a polygonal wall of the nipple which may be engaged by a wrench or spanner when it is desired to turn the nipple, and 12 indicates an annular flange of the nipple adapted to be engaged by an annular shoulder 13 of a jaw operating element preferably a clamping ring 14, which latter is provided with interior threads adapted to engage the threads 5 of the ferrule.

The nipple 8 comprises a reduced portion 15, the exterior wall 16 of which is conical or inclined to the longitudinal axis of the nipple, forming an inclined seat for the conduit 1, decreasing in diameter from the intermediate portion of the nipple. Preferably the angle of the inclined wall 16 of the nipple is such that its conical surface is parallel to the conical wall 4 of the ferrule, and the wall 16 approximates the wall of the passageway 9 at the inner end of the nipple, being slightly inwardly reduced or curved at its end portion as at 17.

In assembling the parts, the conduit 1 is introduced into the armor tube 2 and a projecting portion of the conduit is then pushed into the ferrule until it is transversely opposite the seat 4, with the extreme end of the conduit substantially flush with the outer end of the ferrule. The armor tube may then be screwed into the ferrule, if this has not already been done. The extended reduced portion 15 of the nipple is then inserted within the passageway of the inner tube and the coupling ring 14 is placed in position with its flange 13 over the flange 12 and with its threads engaging those of the outer end of the ferrule. When the ring 14 is turned in one direction, the nipple 8 will be moved longitudinally inwardly toward the inner tube and a portion of the inner tube will be gradually compressed between the tapering surfaces, or hose seats, of the nipple and ferrule, and sufficient pressure may be developed to provide a fluid-tight joint at this point, the inner tube being of relatively soft material and serving as a packing or gasket.

It will be observed that by the above described construction substantially no transverse pressure occurs between the armor tube and the flexible inner tube, and for this reason there is no tendency for the armor to rupture or puncture the inner tube. The pressure at the joint is engendered by a longitudinal movement of the parts as distinct from a direct transverse compression, so that even though the armor tube be quite closely associated with the inner tube there is no tendency to the production of transverse pressure therebetween. Furthermore, the axially inclined seats of the nipple and the ferrule are so disposed relatively to the attaching means for the armor tube, that the transverse pressure developed by the longitudinal movement of the coupling elements is beyond the end of the armor tube. Thus the inner tube and the armor tube are efficiently coupled and a fluid-tight joint is produced while at the same time the loose association of the armor tube and the inner tube at points beyond the joint is preserved. Under these circumstances, it will be readily perceived that upon turning the coupling ring in the opposite direction, the pressure at the joint may be relieved, the coupling removed and the inner tube readily drawn forth for repair, replacement or other purpose. Tendency of the armor tube to move in a longitudinal direction relatively to the inner tube or the ferrule is resisted by its threaded engagement with the ferrule.

It will be understood that when the invention is embodied in a section of a conduit such as illustrated and above described, the opposite end of the section is provided with similar coupling elements as indicated generally at 18.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. A conduit section having a smooth uniform bore throughout its length, comprising a flexible armor tube, a flexible hose surrounded thereby and projecting beyond the end of said tube, a tubular nipple tapered at one end and having the other formed to coact with a coupling member of an adjacent section, the bore of said nipple being substantially equal to the bore of said hose and the tapered end extending into said hose to a point substantially opposite the end of said tube, a tubular ferrule having a portion of its interior surface formed to coact with the exterior surface of said armor tube and prevent relative longitudinal movement and its remaining interior surface oppositely and correspondingly tapered to coact with the tapered portion of the nipple and grip the end of the hose therebetween, and an intervening member coacting with said nipple and said ferrule to cause a relative longitudinal movement of said parts as it is rotated to increase or decrease the gripping action on the end of said hose between the correspondingly tapered surfaces.

2. A conduit section having a smooth uniform bore throughout its length, comprising an exterior flexible armor tube, a smooth flexible hose loosely surrounded thereby and projecting beyond the end of said tube, a tubular nipple tapered at one end and having the other formed to coact with a coupling member of an adjacent section, the bore of said nipple being substantially equal to the bore of said hose and the tapered end extending into said hose to a point substantially opposite the end of said tube, a tubular ferrule having a portion of its interior surface formed to coact with the exterior surface of said armor tube and prevent relative longitudinal movement and its remaining interior surface oppositely and correspondingly tapered to coact with the tapered portion of the nipple and grip the entire projecting end of the hose therebetween, a flange on one of said parts and an exterior threaded surface on the other, and an intervening member coacting with the flange and threaded surface of said nipple and ferrule to cause a relative longitudinal movement of said parts as it is rotated to increase or decrease the gripping action on the end of said hose between the correspondingly tapered surfaces.

In testimony whereof I affix my signature, in the presence of two witnesses.

F. E. PARADIS.

Witnesses:
 JOHN W. DARLING,
 H. W. McLERNON.